(12) United States Patent
Herbst (10) Patent No.: US 7,590,320 B2
(45) Date of Patent: Sep. 15, 2009

(54) TAPERED CABLE FOR USE IN FIBER TO THE PREMISES APPLICATIONS

(75) Inventor: Brian Herbst, Spartanburg, SC (US)

(73) Assignee: AFL Telecommunications LLC, Spartanburg, SC (US)

( * ) Notice: Subject to any disclaimer, the term of this patent is extended or adjusted under 35 U.S.C. 154(b) by 0 days.

(21) Appl. No.: 11/911,731

(22) PCT Filed: Aug. 8, 2006

(86) PCT No.: PCT/US2006/030852

§ 371 (c)(1),
(2), (4) Date: Apr. 15, 2008

(87) PCT Pub. No.: WO2007/021673

PCT Pub. Date: Feb. 22, 2007

(65) Prior Publication Data

US 2008/0193091 A1    Aug. 14, 2008

Related U.S. Application Data

(60) Provisional application No. 60/707,553, filed on Aug. 12, 2005.

(51) Int. Cl.
*G02B 6/00* (2006.01)
*G02B 6/44* (2006.01)

(52) U.S. Cl. .......... 385/100; 385/106; 385/135
(58) Field of Classification Search .......... 385/100, 385/134, 135, 106, 139
See application file for complete search history.

(56) References Cited

U.S. PATENT DOCUMENTS

| | | | |
|---|---|---|---|
| 5,125,060 A | | 6/1992 | Edmundson |
| 5,657,413 A * | | 8/1997 | Ray et al. .......... 385/139 |
| 5,905,834 A | | 5/1999 | Anderson et al. |
| 6,619,697 B2 | | 9/2003 | Griffioen et al. |
| 7,088,893 B2 * | | 8/2006 | Cooke et al. .......... 385/100 |
| 7,120,347 B2 * | | 10/2006 | Blackwell et al. .......... 385/135 |
| 2005/0175308 A1 * | | 8/2005 | Elkins et al. .......... 385/135 |

* cited by examiner

*Primary Examiner*—Hemang Sanghavi
(74) *Attorney, Agent, or Firm*—Sughrue Mion, PLLC (57) ABSTRACT

A tapered fiber optic distribution cable that includes a plurality of drop cables (2) having at least one predetermined breakout location where a drop cable is withdrawn from the tapered distribution cable. The drop cables are bound together to form the tapered fiber optic distribution cable by binding members (5) or helical winding. Each drop cable (2) contains a plurality of optical fibers which may be reconnectorized according to a user's preferences.

20 Claims, 11 Drawing Sheets

TAPERED CABLE FOR USE IN FIBER TO THE PREMISES APPLICATIONS

CROSS-REFERENCE TO RELATED APPLICATION

This application claims priority from provisional application 60/707,553 filed on Aug. 12, 2005, the disclosure of which is incorporated herein by reference in its entirety.

BACKGROUND OF THE INVENTION

1. Field of the Invention

The present invention relates to a fiber optic distribution cable and, more specifically, to a factory installed termination system where a standard fiber optic cable is outfitted with fiber optic connections along its length at predetermined locations.

2. Description of the Related Art

The use of optical fibers is becoming increasingly popular. This is by virtue of the growth of a variety of applications; including voice communications, audio/video transmissions, data transmissions, and various other internet related services. Typical applications of optical fiber systems include: cable television services, university campus networks, office networks, industrial plant process control systems, and electric utilities. Fiber optics are steadily replacing copper wire as a means of communicating and, thus, optical fiber systems are extended to connect each individual office, room or other location in need of high speed communications.

Due to this increase in demand for fiber optic distribution systems coupled with the need to provide fiber optic access directly to user devices, many individual access points and splices are required. However, providing these numerous individual access points has many drawbacks. Conventionally, in order to provide this access, a main fiber optic cable, containing many optical fibers, must be routed near a multitude of locations. In one embodiment, in order to provide access to a particular location, the fiber optic cable must be spliced at each particular location. Invasively, the external jacket of an optical fiber must be removed to perform splicing. Then the fibers are accessed by cutting open one of the resident buffer tubes wherein the fibers are cut and spliced onto a suitable drop cable. Finally, the exposed area of the cable is closed up and sealed. This process creates a breakout point from which the optical fiber can then be branched to a home. This procedure is typically done in a factory and then brought out to the installation site. In another embodiment, the fiber optic cable enters a splice box where the cable is opened, fibers exposed and spliced onto cables designed specifically to route to a residence, dwelling unit or commercial property. In this case, since the splices are encased by the splice box there is no need for closing up and sealing the cable. The drawback of this method is it requires special equipment and specially trained technicians to perform the task which can be quite costly.

These conventional techniques create an invasive risk as well as associated costs. Optical fibers are extremely fragile and must be handled carefully to avoid breakage. Knots, kinks, twists and bends in the optical fiber will ruin the fiber's ability to transmit light. In some cases, a bend or break in an optical fiber will completely disrupt a system's performance.

Additionally, there is a high cost associated with optical fiber splicing. The actual cost of the fiber is nominal in comparison to the cost of splicing the fiber. Splicing typically requires a skilled technician and special equipment. Typically, field splicing is done by a different set of technicians than those installing the cable. Thus, a special trip to each location is required to setup and splice the fibers. As the number of splices done in a fiber to the premises type application is rather small, the cost per splice may be high given the labor cost and the time required to splice the fiber.

To address these issues, several approaches have been taken to reduce the need for in-the-field splicing. In one approach, disclosed in U.S. Published Patent Application 2005/0175308, a factory prepared fiber optic distribution cable that reduces the need for field splicing has been developed. The prepared cable has a tubular body for protecting a plurality of individual optical fibers. Additionally, the cable has at least one pre-terminated optical fiber withdrawn from the tubular body at a predetermined access location with a connector attached to the pre-terminated optical fiber. The cable also includes a protective shell for protecting the pre-connectorized optical fibers after being removed from the tubular body. In the field, a drop cable is then connected to the pre-connectorized optical fiber near the point of withdrawal from the tubular body. A disadvantage of this system is that excess hardware and connectors are required to bring the optical network to a terminal device. Furthermore, a protective shell, in additional to the tubular body adds additional components to this cable system. For example, the tubular body of the distribution cable includes a protective shell on its exterior for housing the disassociated optical fiber. Additionally, a connector is required to connect this disassociated optical fiber to a drop cable for routing to the terminal device.

Another drawback of this approach is increased installation cost. The inclusion of a tubular body and protective shell effectively increases the minimum working bending radius. Thus, installation becomes more difficult as working product exhibits reduced flexibility. Additionally, where specific installations induce bends in the cable when installed, the rate of fiber damage during installation may increase.

Accordingly, there is a need for a factory assembled, pre-terminated fiber optic distribution cable that eliminates the need for excess splicing as well as the protective hardware on the exterior of the distribution cable. As such, it is desirable to have a pre-connectorized distribution cable having breakout points at predetermined locations without excess hardware or connectivity means without increasing the minimum working bending radius.

SUMMARY OF THE INVENTION

Accordingly, an aspect of the present invention is to provide a tapered cable involving the use of small stand alone cables that can be bundled together. Where breakouts are required, one of the bundled cables is routed away from the bundled cable. Each breakout cable contains a predetermined number of optical fibers each outfitted with fiber connectors. Further, each cable and each optical fiber can be set at a predetermined length so as to reach a terminal device without the need for additional splicing or intervening connectors. Also, the inclusion of external protective members may be eliminated such that the minimum working radius of the cable may be reduced.

According to an aspect of the present invention, there is provided a tapered fiber optic distribution cable comprising: a plurality of drop cables bundled together and a breakout point located along the fiber optic distribution cable wherein one of the drop cables has a first length shorter than a second length of the tapered fiber optic distribution cable and has an end terminating at the breakout point.

A substantial portion of an exterior of the tapered fiber optic distribution cable may comprise the drop cables.

The tapered fiber optic distribution cables may be bundled together by helical winding.

According to another aspect of the present invention, there is provided a method of making a tapered fiber optic distribution cable comprising: providing a plurality of drop cables, cutting one of the drop cables to a predetermined length to make a cut drop cable and binding the drop cable together. The drop cables may be bound together by helical winding, a binder clip, tape, shrink wrap or an adhesive. The end of the cut drop cable may be prepared at the breakout location with an optical connector.

Details of other embodiments are included in the following detailed description and the accompanying drawings.

BRIEF DESCRIPTION OF THE DRAWINGS

The aspects and features of the present invention will be more clearly understood from the following detailed description taken in conjunction with the accompanying drawings, in which.

DESCRIPTION OF THE EXEMPLARY EMBODIMENTS

Reference is now made to the drawings, in which the same reference numerals are used throughout the different drawings to designate the same or similar components.

With reference to the accompanying drawings, exemplary embodiments of the present invention are described in detail below.

Figure 1:
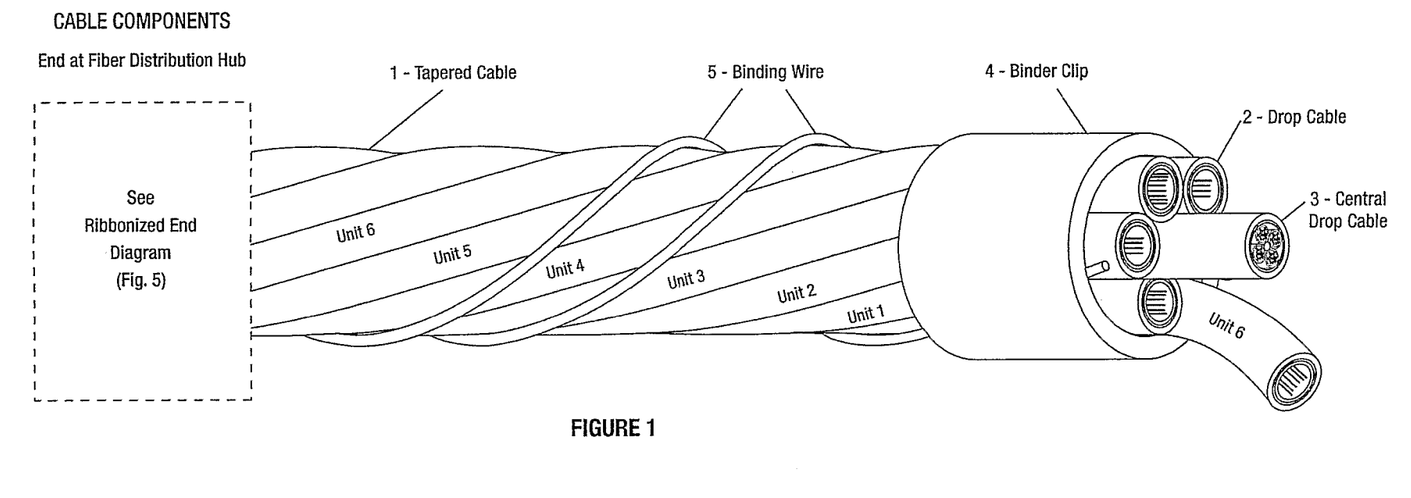
FIG. 1 is a diagram of a tapered cable comprised of seven drop cables according to an exemplary embodiment of the present invention.

FIG. 1 is a view of a tapered cable 1 according to one exemplary embodiment of the present invention. In this exemplary embodiment, six drop cables 2 are helically wound around central drop cable 3. The drop cables 2 and the central drop cable 3 are bound together using binder clip 4 and binding wire 5. However, the present invention is not so limited and, thus, the number of drop cables 2 and the method of binding the drop cables 2 together may vary. For example, the central drop cable 3 may be omitted and the number of drop cables 2 desired for a particular application may be bound together without being helically wound. Additionally, the binder clip 4 and the binding wire 5 need not be used in combination, as each standing alone may be used to bind the drop cables. Conversely, if the drop cables 2 are helically wound, the binder clip 4 or binding wire 5 may be eliminated.

Figure 2:
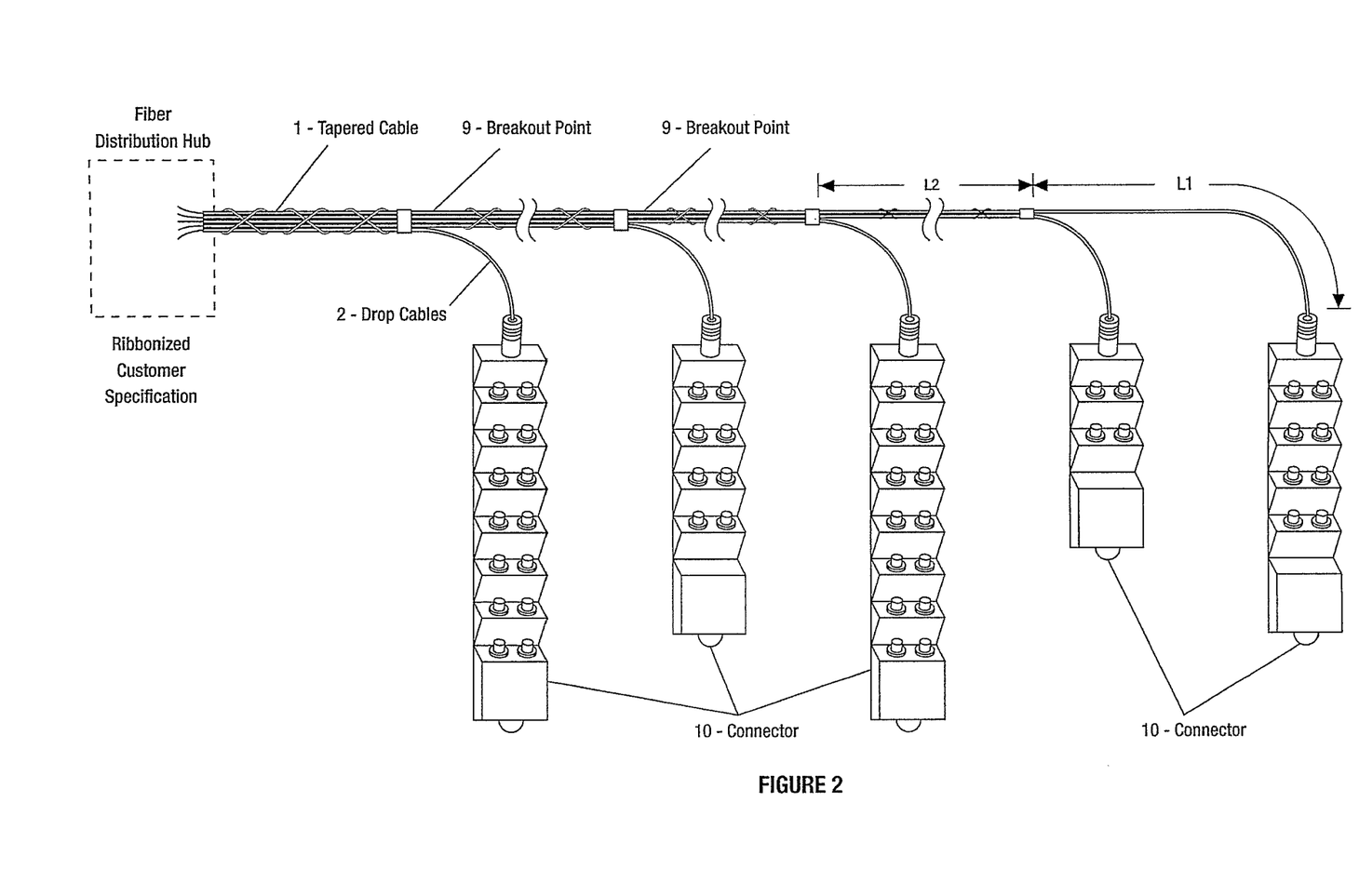
FIG. 2 is a diagram of a tapered cable according to the an exemplary embodiment of the present invention showing numerous breakout points.

FIG. 2 illustrates the breakout design of the tapered cable 1 according to an exemplary embodiment of the present invention. The tapered cable 1 according to this exemplary embodiment includes a series of drop cables 2 which are split out at various breakout points 9, which are set at predetermined locations throughout the length of tapered cable 1. The distance between breakouts, designated by $L_2$ in FIG. 2, may vary according to each customer or application requirement. Additionally, the drop cable 2 at each breakout point 9 is fitted with an optical connector 10 or connectors. Therefore, where individual drop cables 2 are broken out of the tapered cable 1, optical service can be provided to a specific location (e.g., home, office, building, etc) without the need for further splicing. Typically, the end user or customer specifies the location of breakout points 9 based on each location within cable run where a drop cable 2 is needed to provide optical service.

Accordingly, this exemplary embodiment of the present invention requires no invasive procedures to redirect optical service away from the tapered cable 1 run because drop cable 2 is merely pulled from the exterior of the tapered cable 1. Conventionally, a standard fiber optic cable houses all the fibers within an exterior shell. To "breakout" a fiber or fibers, the exterior protective shell must be broken open to access the individual fibers. After accessing the fibers required at the breakout point, the standard fiber optic cable is then resealed. In contrast, according to this exemplary embodiment, the tapered cable 1 is comprised of a plurality of drop cables 2, each having its own exterior protective shell or covering.

Figure 3:
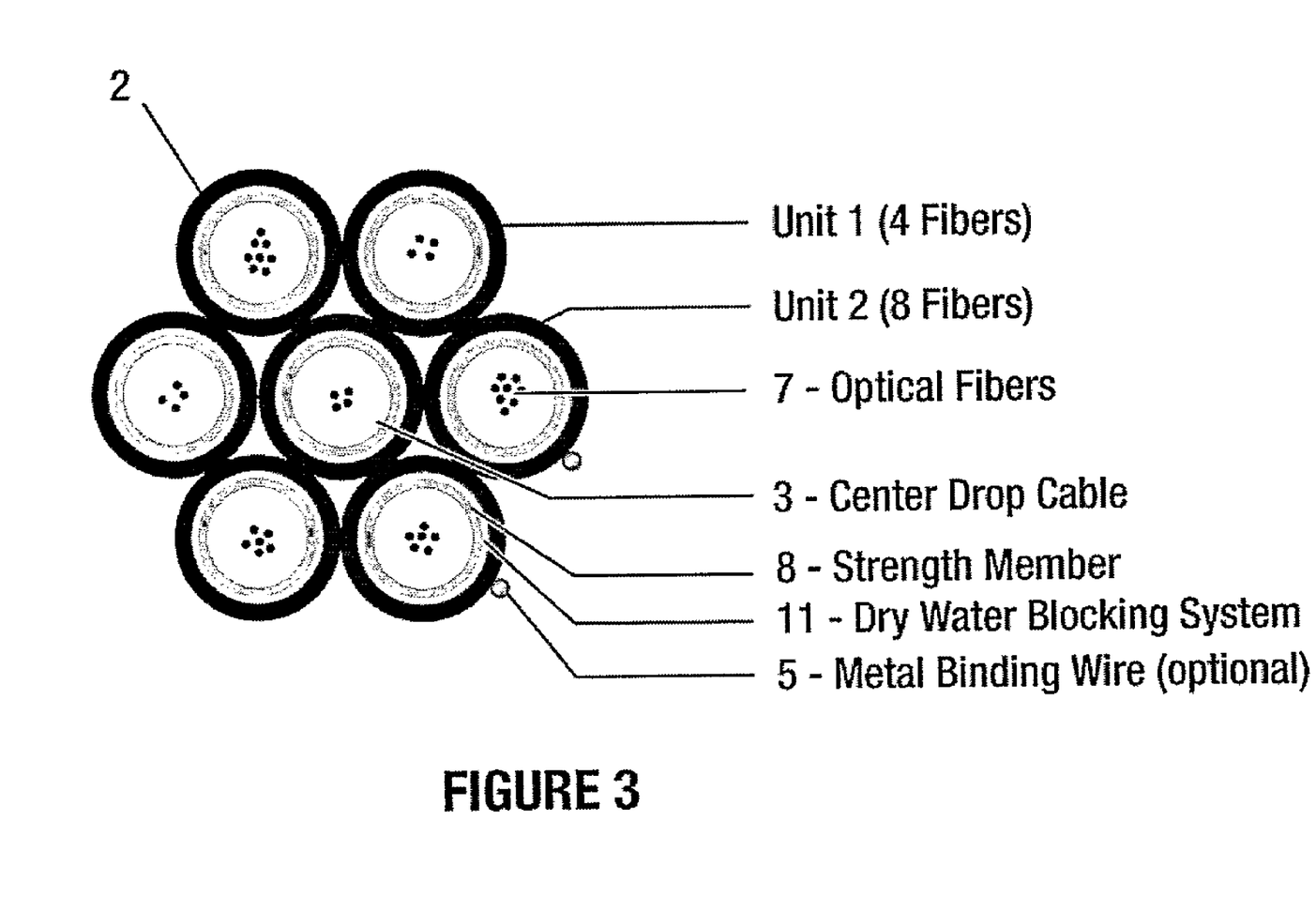
FIG. 3 is a diagram of an exemplary embodiment illustrating a cross section of a drop cable having optical fibers of varying length with individual connectors affixed.

FIG. 3 shows a cross section of a tapered cable 1 as shown in FIG. 1. According to an embodiment of the present invention. In this embodiment, each drop cable 2 has a plurality of optical fibers 7. The optical fibers 7 are protected by a surrounding strength member 8 which may be covered with a dry water blocking system 11.

Figure 4A:
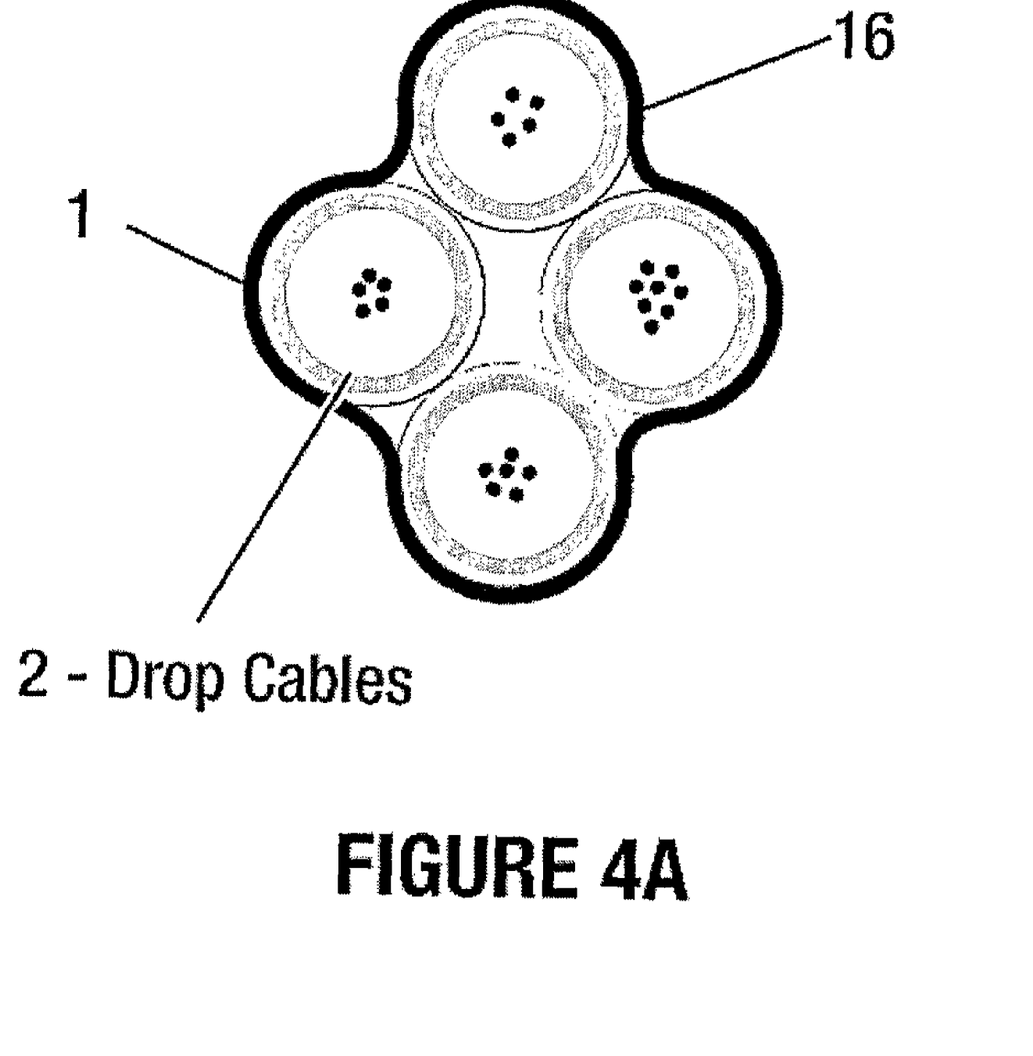
FIGS. 4A-4E illustrate various exemplary embodiments of tapered distributions cables.
Figure 4B:
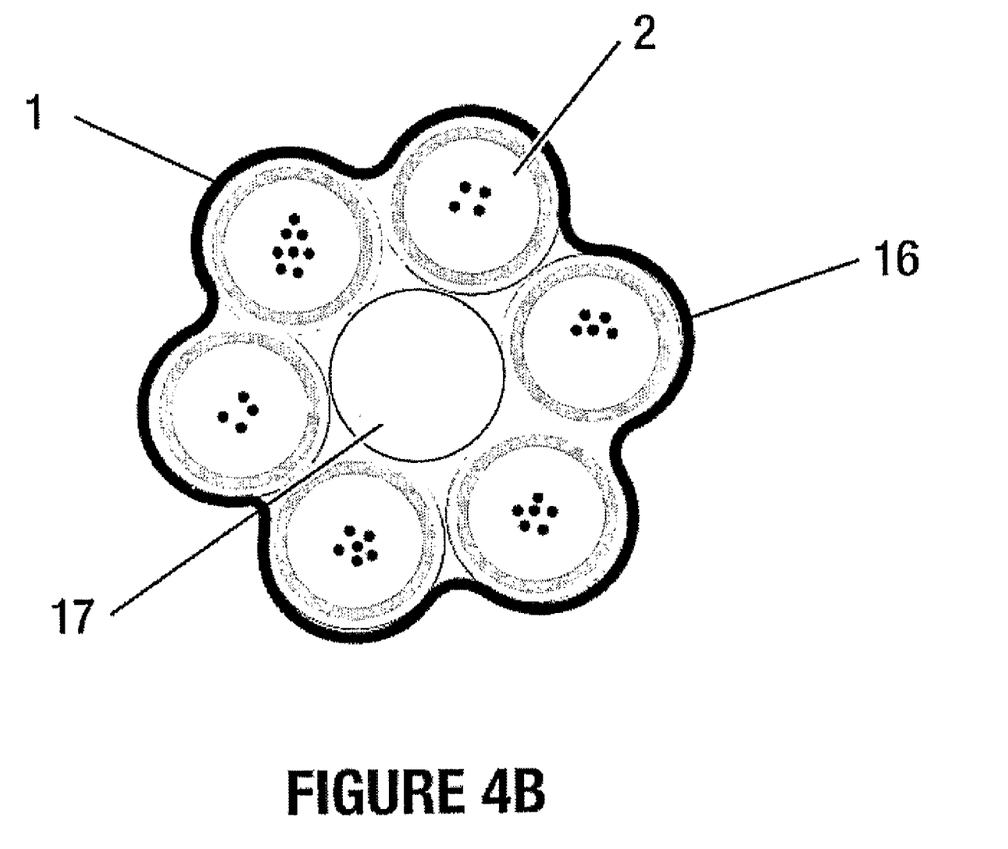
Figure 4C:
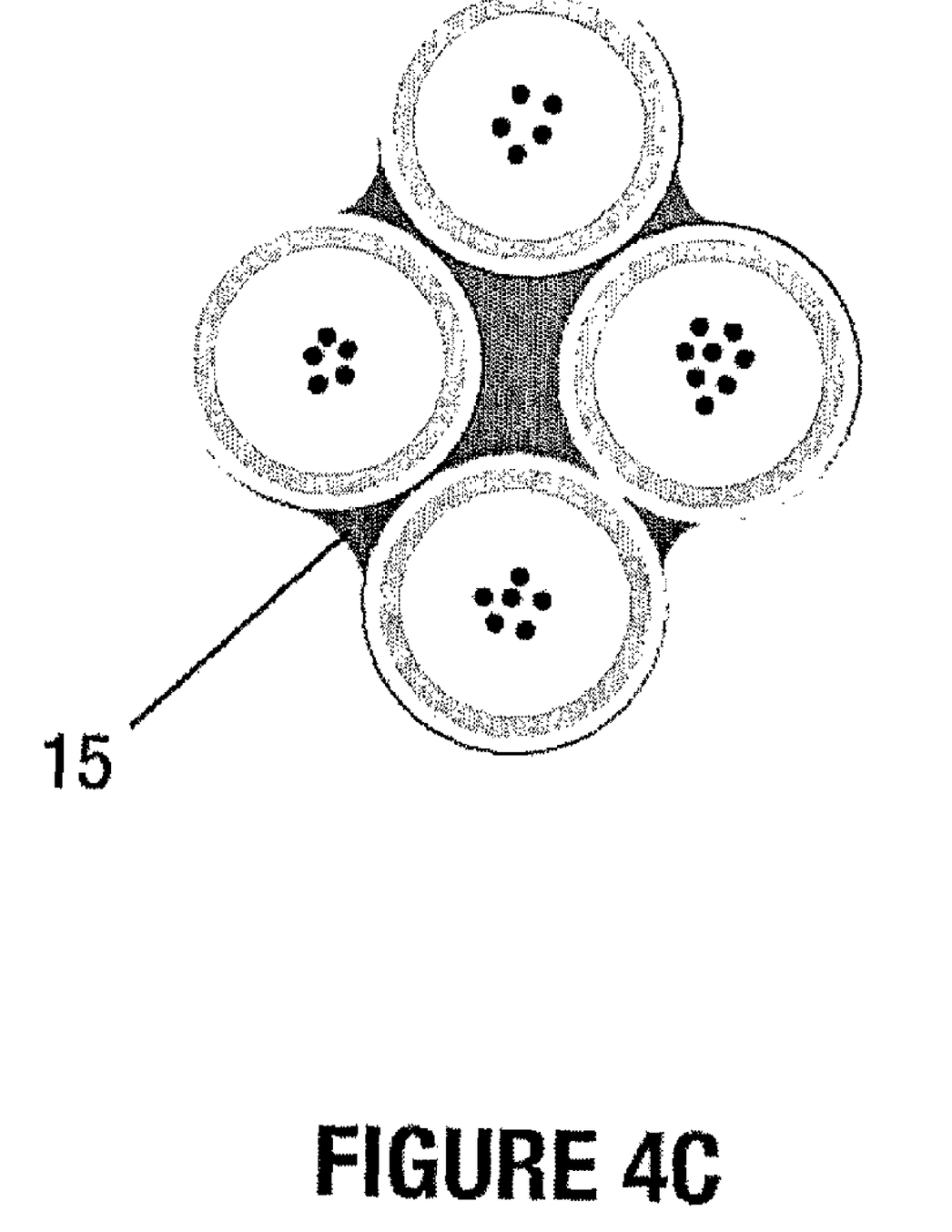
Figure 4D:
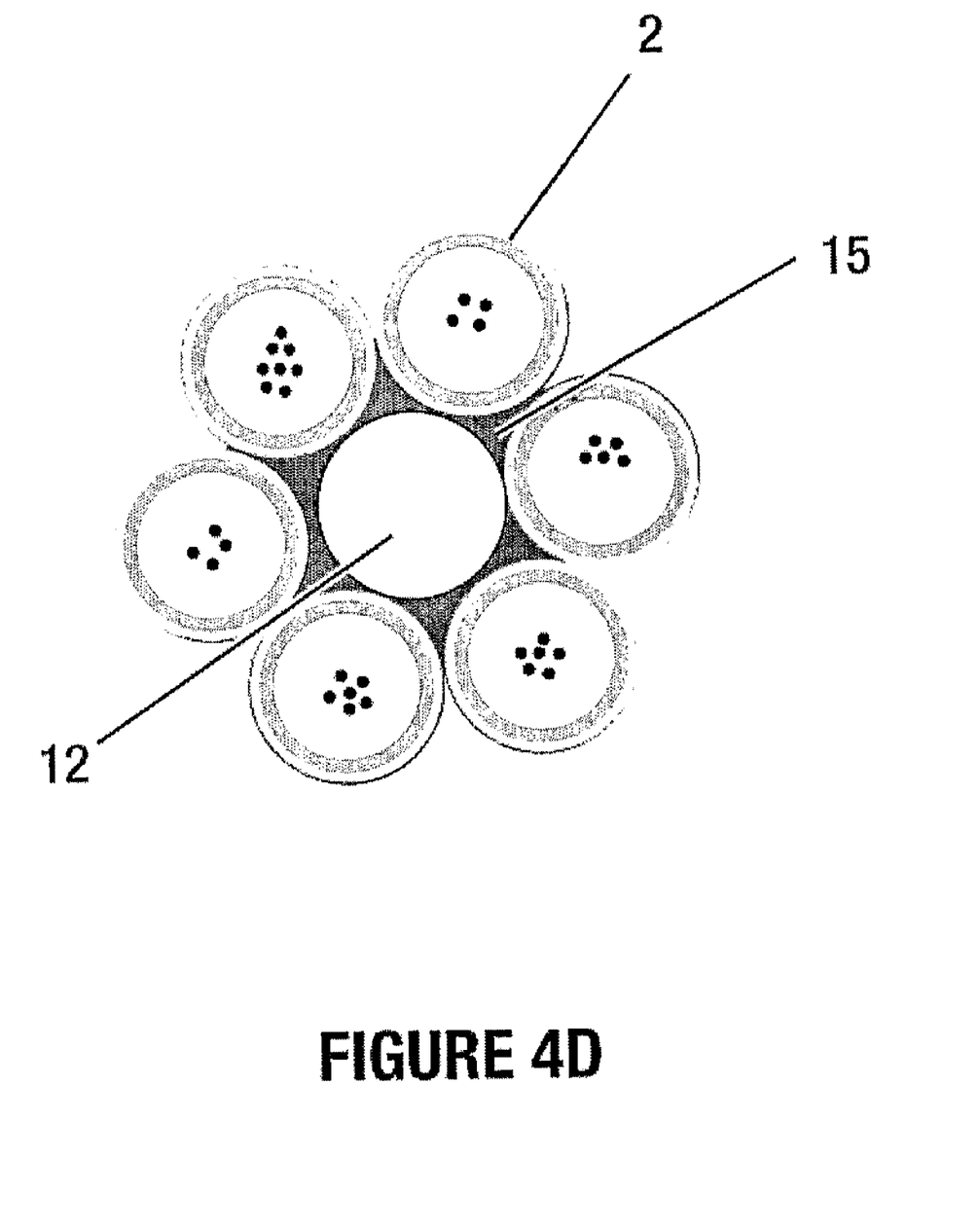
Figure 4E:
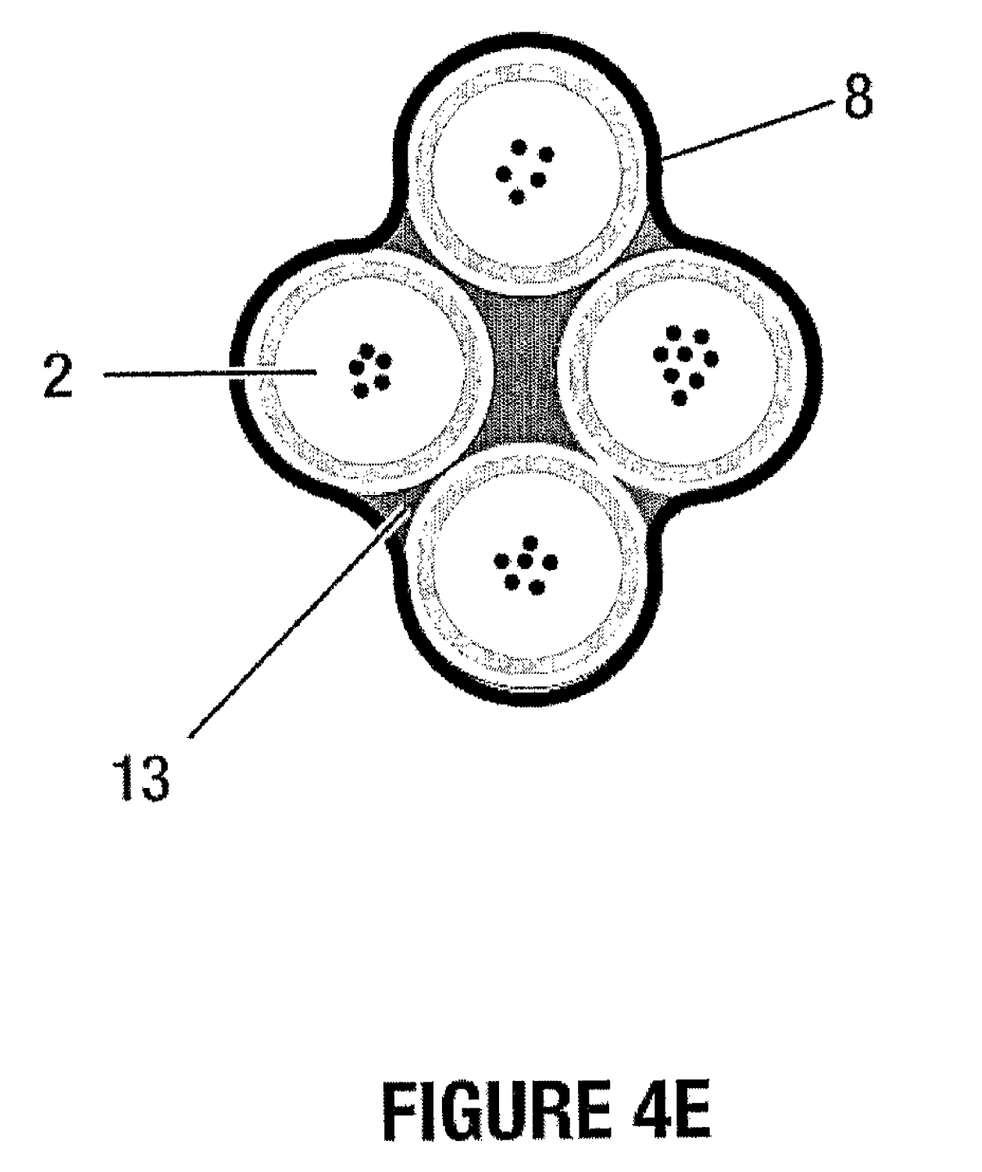

Because each drop cable 2 is provided with a strength member 8 and dry water blocking system 11, the tapered cable 1 may be bound by any number of techniques familiar to those skilled in the art as no additional protection is required. In this depiction binder clip 4 is omitted, but the binding wire 5 is shown wrapping the exterior of the drop cables 2. As shown in FIG. 1, binder clips 4 may be located at intermittent locations throughout the length of the tapered cable 1 if additional securing strength is required. Additionally, as shown in FIG. 4E, binding members 8 may be located at each breakout point 9. However, depending on the length of cable run between successive breakout points 9, these binding members 8 may be located at intermittent intervals between successive breakout points 9 in order to bind the plurality of drop cables 2 along the length of tapered cable 1. However, binding of the drop cables 2 with a binding clip 4 or binding wire 5 is not necessary to provide a suitable product.

Furthermore, the strength members 8 and dry water blocking systems 11 used can be customized depending on whether the application is for an aerial or buried application.

Additionally, binding members may include, in addition to or in replacement of binder clip 4 and binding wire 5, heat shrink materials, extruded thin jackets, adhesive binding tape, and mechanical clasps or the like. Additionally, internal binding members such as a glue or other binder may be applied to secure the cables together through internal adhesion.

As mentioned above, each individual breakout point 9 may be determined in advance by a customer depending upon a specific cable run where specific access points are determined in advance of manufacture. However, in addition to the identification of each individual breakout point 8, the customer may also specify the length $L_1$ (see FIG. 2) of each drop cable 2 that extends from its corresponding breakout point 9. Thus, the need for splicing near the breakout point can be eliminated as the terminal end of the drop cable 2 can be designed to reach a terminal device or junction area at each specific breakout location.

FIG. 2 is a view of an exemplary embodiment of the present invention where the individual optical fibers 7 are preconnectorized to a connector 10. When connector 10 is provided, the need for excessive splicing at each breakout point is minimized. For example, if a breakout point 9 is desired for a home application, the drop cable 2 may be sized at a length so as to extend into the home. Because the connector 10 is included, once the drop cable 2 is run into the home, no further splicing is required.

Furthermore, the each optical fiber 7 within each drop cable 2 may be fitted an individual connector 12 and the individual optical fibers 7 may be customized based on a user's request.

Figure 6:
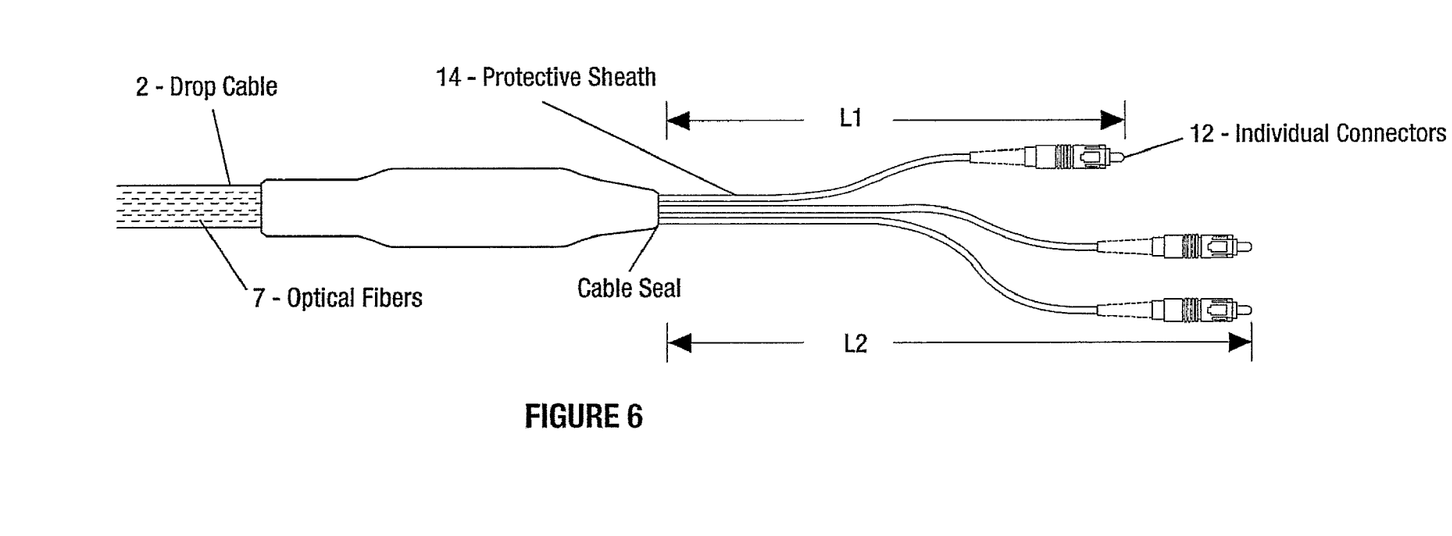
FIG. 6 is a diagram of a drop cable according to an exemplary embodiment of the present invention.

Alternatively, as shown in FIG. 6, according to another exemplary embodiment, connector 10 may be combined, at a breakout point, with the use of individual connectors 12 applied to one or more of the optical fibers 7 at that breakout point for each drop cable 2. In this exemplary embodiment a cable seal 18 is used to transition from drop cable 2 to the optical fibers 7 fitted with a protection sheath 14. Each individual optical fiber 7 at each breakout point may be cut to a different length, i.e., $L_1$ and $L_2$, and individual connectors 12 may be fitted one or several optical fibers 7. Also, each optical fiber 7 may be fitted with protective sheath 14 at or near the point of transition. Thus, in this embodiment, the user or customer may provide that individual optical fiber 7 have differing lengths and/or connector types. As would be recognized by those of skill in the art, a mix of connector types may be used in combination, e.g., single connectors, multi-connectors, ST connectors and FC connectors, or the like.

Figure 5:
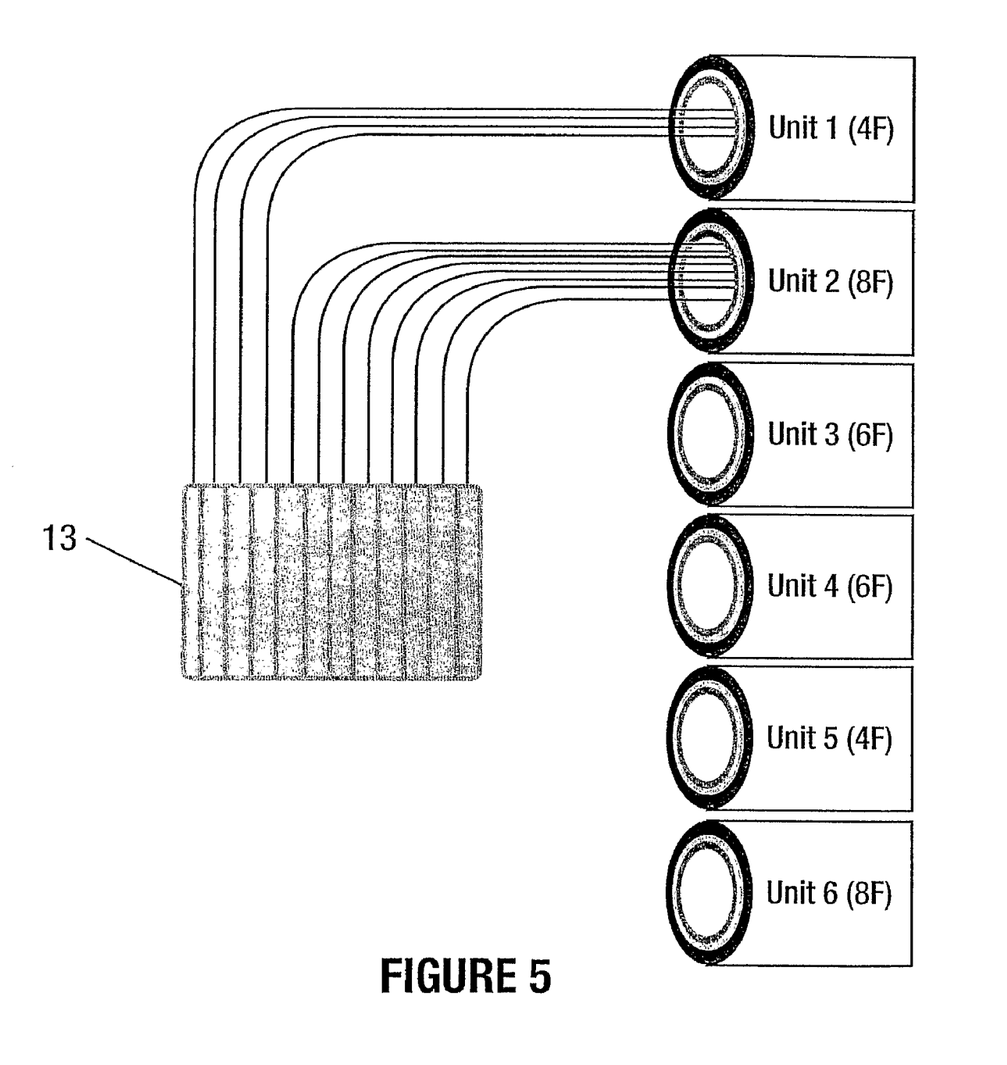
FIG. 5 is a diagram of ribbonized connector.

Additionally, as shown in FIG. 5, one end of the tapered cable 1 may be fitted with a ribbonized end 13 for the use in applications such as a fiber distribution hub for increased productivity in splicing.

Although, the embodiments disclosed above were explained in combination with tapered cable 1 comprising six drop cables 2 surrounding a central drop cable 3, the present invention is not limited thereto. FIG. 4A-4B show other tapered cable 1 designs that may be used to implement the present invention. FIG. 4A shows the cross section of a tapered cable comprised of four drop cables 2 surrounded by binding member 16. Another embodiment is shown in FIG. 4B, wherein the central drop cable 2 is replaced with a central strength member 17. FIGS. 4C and 4D show similar cable designs having binding member 16 replaced with an internal binding material 15. Alternatively, binding member 16 may also be combined with an internal adhesive to secure drop cables 2 together as shown in FIG. 4E.

Figure 7:
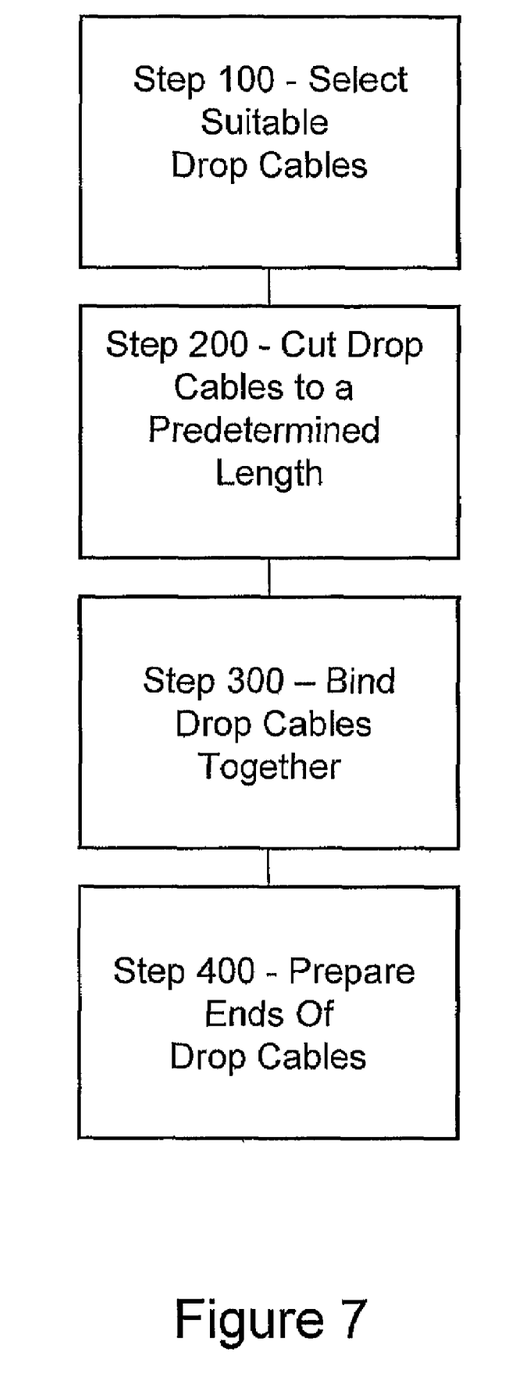
FIG. 7 is a block diagram outlining a method for making a tapered fiber optic distribution cable.

Next, a method of making the tapered cable 1 according to an exemplary embodiment of the present invention will be described with reference to FIG. 7. First, drop cables 2 designed to be for outside the plant applications having a suitable size and fiber count for the target applications are selected at step 100. At each predetermined breakout point 9, a drop cable is cut and attached to other drop cables to form the tapered cable 1 at steps 200 & 300. The drop cables 2 may be bound together by helically winding them together using standard cable manufacturing equipment. The tapered cable 1 may be bound at each corresponding breakout point 9 using a binder clip 4, a binding wire 5, tape, heat shrink or other material for holding the drop cables 2 together. This process is then repeated for each breakout point 9 for each drop cable 2. Subsequently, the tapered cable 1 is respooled back to these breakout points 9 and an excess portion of the drop cable 2 is then prepared according to customer needs and may include the cable seal 18, connectors 10 and 12, and optical fibers 7 of varying lengths at step 400.

Although these exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A tapered fiber optic distribution cable, comprising:
a plurality of drop cables bundled together; and
a breakout point located along the tapered fiber optic distribution cable,
wherein one of the drop cables has a first length shorter than a second length of the tapered fiber optic distribution cable and has an end terminating at the breakout point,
wherein exteriors of at least two of said plurality of drop cables are in direct contact.

2. The tapered fiber optic distribution cable according to claim 1, wherein a substantial portion of an exterior of the tapered fiber optic distribution cable comprises a portion of the plurality of drop cables.

3. The tapered fiber optic distribution cable according to claim 1, wherein the plurality of drop cables are bundled by helical winding.

4. The tapered fiber optic distribution cable according to claim 1, wherein the plurality of drop cables are bundled together by a binding member.

5. The tapered fiber optic distribution cable according to claim 1, wherein at least one of the drop cables is pre-fitted with an optical fitting.

6. The tapered fiber optic distribution cable according to claim 1, further comprising a plurality of binding members disposed at intermittent locations along the length of the tapered fiber optic distribution cable, wherein each of the binding members comprise a collar.

7. The tapered fiber optic distribution cable according the claim 1, wherein the binding member comprises a wire wrapped around the drop cables.

8. The tapered fiber optic distribution cable according the claim 1, further comprising a core cable, wherein the drop cables are helically wound around the core cable.

9. The tapered fiber optic distribution cable according to claim 5, wherein the core cable comprises a drop cable having a length equal to the total length.

10. The tapered fiber optic distribution cable according to claim 1, wherein at least one of the drop cables comprises a plurality of optical fibers, at least one of said optical fibers is fitted with an individual fiber optic connector.

11. The tapered fiber optic distribution cable according to claim 1, wherein at least one of the drop cables comprises a plurality of optical fibers, at least two of said optical fibers are fitted with a single connector.

12. A tapered fiber optic distribution cable, comprising:
a first drop cable having a first predetermined length and containing a first number of optical fibers;
a second drop cable having a second predetermined length and containing a second number of optical fibers; and
a binding member to secure the first drop cable and the second drop cable together,
wherein each of the first number of optical fibers and each of the second number of optical fibers are different and the first predetermined length and the second predetermined length are different,
wherein exteriors of the first drop cable and the second drop cable are in direct contact.

13. The tapered fiber optic distribution cable according to claim 12, wherein a substantial portion of the exterior of the tapered fiber optic distribution cable comprises at least one of the first drop cable and the second drop cable.

14. The tapered fiber optic distribution cable according to claim 9, wherein said binding member comprises at least one of a wire, a sheath, an adhesive and a collar.

15. A method of making a tapered fiber optic distribution cable, the method comprising;
providing a plurality of drop cables;
cutting one of drop cables to a predetermined breakout length to make a cut drop cable; and
binding the drop cables together,
wherein exteriors of at least two of said plurality of drop cables are in direct contact.

16. The method of making a tapered fiber optic distribution cable according to claim 15, wherein the drop cables are bound together by helically winding the drop cables.

17. The method of making a tapered fiber optic distribution cable according to claim 15, wherein the drop cables are bound together by at least one of a binder clip, tape, shrink wrap and adhesive.

18. The method of making a tapered fiber optic distribution cable according to claim 15, further comprising:
binding the cut drop cable to the other drop cables at a breakout location corresponding to the predetermined breakout length with at least one of a binder clip, tape, shrink wrap and adhesive.

19. The method of making a tapered fiber optic distribution cable according to claim 18, further comprising:
preparing an end of the cut drop cable near the breakout location with an optical connector.

20. The method of making a tapered fiber optic distribution cable according to claim 15, wherein a substantial portion of an exterior of the tapered fiber optic distribution cable comprises the plurality of drop cables.

* * * * *